UNITED STATES PATENT OFFICE 2,550,953

CATALYTIC HYDROGENATION OF UNSATURATED FLUOROHYDROCARBONS

Paul L. Barrick, Wilmington, Del., assignor to E. I. du Pont de Nemours & Company, Wilmington, Del., a corporation of Delaware No Drawing. Application December 8, 1944, Serial No. 567,324

8 Claims. (Cl. 260—648)

This invention relates to a catalytic hydrogenation process and more particularly to the hydrogenation of unsaturated aliphatic fluorinated hydrocarbons.

This invention has as an object the provision of a method for obtaining aliphatic, including cycloaliphatic, saturated fluorohydrocarbons from the corresponding aliphatic, including cycloaliphatic, unsaturated fluorohydrocarbons. A further object is the provision of a process wherein hydrogenation of aliphatic, including cycloaliphatic, unsaturated fluorohydrocarbons may be effected without substantial dehydrohalogenation. A still further object is the provision of a simple and efficient process for preparing short chain fluoroalkanes from the corresponding unsaturated acyclic fluorohydrocarbons. A still further object is the provision of a practicable process for obtaining a saturated polyfluorohydrocarbon, containing a carbon ring having fluorine atoms attached directly to said ring, from the corresponding alicyclic fluorohydrocarbon. Additional objects will become apparent from an examination of the following description and claims.

These and other objects and advantages are accomplished according to the herein-described invention which broadly comprises heating, in the liquid phase under a superatmospheric pressure in the presence of a hydrogenation catalyst, an aliphatic, including cycloaliphatic, unsaturated fluorohydrocarbon with hydrogen, said unsaturated fluorohydrocarbon containing an unsaturated linkage between aliphatic, including cycloaliphatic, carbon atoms and each fluorine atom in said unsaturated fluorohydrocarbon being attached to an aliphatic, including cycloaliphatic, carbon atom.

In a more restricted embodiment this invention comprises heating, in the liquid phase at a temperature within the range of from 20° C. to 200° C. under a pressure within the range of from 100 lbs./sq. in. to 3000 lbs./sq. in. in the presence of a hydrogenation catalyst, an aliphatic, including cycloaliphatic, unsaturated fluorohydrocarbon with hydrogen, said unsaturated fluorohydrocarbon containing an ethylenic linkage between aliphatic, including cycloaliphatic, carbon atoms and each fluorine atom in said unsaturated fluorohydrocarbon being attached to an aliphatic, including cycloaliphatic, carbon atom.

One preferred embodiment of this invention comprises heating with hydrogen, in the liquid phase at a temperature within the range of from 60° C. to 125° C. under a pressure within the range of from 1000 lbs./sq. in. to 2000 lbs./sq. in. in the presence of a hydrogenation catalyst, a fluoroalkene containing from 2 to 9 carbon atoms.

Another preferred embodiment of this invention comprises heating, in the liquid phase at a temperature within the range of from 60° C. to 125° C. under a pressure within the range of from 1000 lbs./sq. in. to 2000 lbs./sq. in. in the presence of a hydrogenation catalyst an ethylenically unsaturated polyfluorohydrocarbon with hydrogen, said unsaturated polyfluorohydrocarbon containing a four-carbon atom ring having fluorine atoms attached directly to said ring and also containing an ethylenic linkage, i. e., a double bond, between aliphatic, including cycloaliphatic, carbon atoms.

The term "cycloaliphatic" as employed herein and in the appended claims is of course synonymous with "alicyclic."

Various arrangements and selections of equipment for the operation of my process are possible. In the preferred arrangement, however, a pressure reactor is charged with a hydrogenation catalyst, e. g., alloy-skeleton nickel, and the fluorohydrocarbon to be hydrogenated. The reactor is then closed, pressured with hydrogen and the reaction mixture is heated with agitation. After an amount of hydrogen corresponding to that theoretically required to effect the desired reduction has been absorbed, agitation is stopped. The reactor is then cooled, opened and the contents are discharged. The reaction mixture is filtered to remove the catalyst and the reaction product is isolated from the filtrate by conventional means.

The following examples, in which proportions are in parts by weight, unless otherwise specified, are given for illustrative purposes and are not intended to place any restrictions on the herein-described invention.

Example I

Thirty-one grams of the dihydrofluoride of monovinylacetylene (3,3-difluorobutene-1) which may be obtained as described in copending application Serial No. 508,241, filed October 29, 1943, by Donald D. Coffman and Leroy Frank Salisbury, now abandoned, and Patent No. 2,451,612 to said Coffman and Salisbury, is dissolved in 100 cc. of absolute ethanol and to this solution is added 5 g. of a nickel catalyst prepared as described hereinafter and this charge is sealed in a shaking autoclave. Hydrogen is forced into the autoclave to a total pressure of 1500 lb./sq. in. at a temperature of 100° C. At the end of 1 hour about ⅓ of a mole of hydrogen has been absorbed and the reactor is cooled, vented, the contents discharged, and filtered to remove the catalyst. From the filtrate there is obtained about 0.25 mole of a substance corresponding substantially to 2,2-difluorobutane. The physical characteristics of the product are: b. p. 30° C., $N_D^{25}$ 1.321, and $d_4^{10}$ 0.911.

The catalyst used in the above example is prepared as follows:

A 1 to 1 aluminum-nickel alloy is completely extracted with 25% aqueous sodium hydroxide solution, using 1 part of sodium hydroxide for each gram of alloy. The resulting pyrophoric nickel is washed with water until neutral and stored under methanol for use.

*Example II*

A pressure reactor is charged with 81 g. of fluoro-2-butadiene-1,3 dissolved in 80 g. of absolute ethanol, and 10 g. of the nickel catalyst prepared as described in Example I. The reactor is closed and pressured with hydrogen to 600 lb./sq. in. at 25° C. The reaction is exothermic, the temperature rising to 65° C. After 3 hours of reaction during which time the temperature is raised to 75° C. hydrogen absorption appears to have stopped. The reactor is cooled, and opened, and its contents are discharged and filtered to remove the catalyst. Fractional distillation of the filtrate yields 33 g. of a product boiling at 24.5–25.5° C., in addition to intermediates containing some unchanged fluoro-2-butadiene-1,3. The fraction boiling at 24.5–25.5° C. has a refractive index $N_D^{12}$ 1.338 and a density $d_4^{12}$ 0.782. These values correspond closely to those in the literature for fluoro-2-butane.

*Example III*

One hundred fifty four grams of 1-vinyl-2,2,3,3-tetrafluorocyclobutane prepared as described in the copending application of Paul L. Barrick, Serial No. 484,239, filed April 23, 1943, now Patent No. 2,462,345, and 10 g. of nickel catalyst prepared as described in Example I are placed in a pressure reactor. The reactor is sealed, and pressured with hydrogen to 1500–2000 lb./sq. in. hydrogen pressure at 80°–100° C. Absorption of hydrogen ceases after ½ hour when one mole of hydrogen has been taken up per mole of fluoroolefin. The mixture is cooled, the autoclave is opened, the contents are discharged, and filtered to remove the catalyst. From the filtrate there is recovered, by fractional distillation, practically a theoretical yield of 1-ethyl-2,2,3,3-tetrafluorocyclobutane having a boiling point of 90–91° C., $N_D^{25}$ 1.337, $d_4^{25}$ 1.1506 and 48.25% fluorine. The product thus obtained is unaffected by treatment with aqueous potassium permanganate, indicating the absence of unsaturation.

*Example IV*

A pressure reactor is charged with 15 grams of 1-ethinyl-2,2,3,3-tetrafluorocyclobutane, prepared as described in the copending application of Paul L. Barrick, Serial No. 484,239, filed April 23, 1943, 85 cc. of absolute ethanol and 5 grams of the nickel catalyst described in Example I. The reactor is closed, heated to 80° C. and pressured with hydrogen to 1500–2000 lb./sq. in. pressure. Absorption of hydrogen ceases in one hour when about 2 moles of hydrogen have been absorbed per mole of the fluorinated acetylene. The reactor is then cooled, opened, and the product is discharged and filtered to remove catalyst. The reaction mixture is steam distilled, and the steam-volatile water-insoluble liquid obtained in this manner is dried over calcium chloride and distilled through a packed column to yield a product boiling at 90° C. which is identical with 1-ethyl-2,2,3,3-tetrafluorocyclobutane.

*Example V*

A pressure reactor is charged with 12 grams of 1-vinyl-3,3,4,4-tetrafluorocyclobutane, prepared as described in the copending application of Paul L. Barrick, Serial No. 484,239, filed April 23, 1943, and 5 grams of the nickel catalyst described in Example I. The reactor is closed, heated to about 80° C. and pressured with hydrogen to 1500–2000 lb./sq. in. After 45 minutes, absorption of hydrogen ceases, the reactor is cooled, opened, and the contents discharged and filtered to remove the catalyst. The reaction product is steam distilled, the steam-volatile, water-insoluble liquid is dried over calcium chloride, and then fractionated to yield a product boiling at 90° C. which is identical with 1-ethyl-2,2,3,3-tetrafluorocyclobutane.

*Example VI*

A pressure reactor is charged with 14 grams of 1(2,2,3,3 - tetrafluorocyclobutyl) - 3,3,4,4 - tetrafluorocyclobutene-1 prepared as described in the copending application of Paul L. Barrick, Serial No. 484,239, filed April 23, 1943, 86 cc. of absolute ethanol, and 5 grams of the nickel catalyst of Example I. The autoclave is closed, heated to 80° C. and pressured to 1500 lb./sq. in. with hydrogen. Absorption of hydrogen ceases after 1 hour when 1 mole of hydrogen has been absorbed per mole of the fluoroolefin. The reactor is cooled, opened, and the contents are discharged and filtered to separate the catalyst. Steam distillation of the reaction product yields a substance melting at about 49–50° C. which is inert to potassium permanganate. The material is found to be identical with an authentic sample of bis-(2,2,3,3-tetrafluorocyclobutyl), prepared by addition of tetrafluoroethylene to 1-vinyl-2,2,3,3-tetrafluorocyclobutane as described in the copending application of Paul L. Barrick, Serial No. 484,239, filed April 23, 1943.

*Example VII*

A pressure reactor is charged with 25 grams of 1-(2,2,3,3-tetrafluorocyclobutyl)-propene-1, prepared as described in the copending application of Paul L. Barrick, Serial No. 484,239, filed April 23, 1943, 100 cc. of absolute ethanol and 5 parts of the nickel catalyst of Example I. The reactor is closed, heated to 80° C. and pressured with hydrogen to 1500 lb./sq. in. Absorption of hydrogen ceases after 1 hour when 1 mole of hydrogen has been absorbed per mole of fluoroolefin. The reactor is cooled, discharged, and the catalyst is removed from the product by decantation. The solution is diluted with water to separate the water-insoluble products which are then dried. The product is distilled and a fraction is collected boiling at 112–113.2° C. having a $N_D^{25}$ of 1.3516, a $d_4^{25}$ of 1.1190 and containing 44.6% fluorine. This material is inert to potassium permanganate.

While this invention has been illustrated with particular reference to the hydrogenation of 3,3-difluorobutene-1; fluoro-2-butadiene-1,3; 1-vinyl-2,2,3,3-tetrafluorocyclobutane; 1-ethinyl-2,2,3,3 - tetrafluorocyclobutane; 1 - vinyl-3,3,4,4- tetrafluorocyclobutane; 1 - (2,2,3,3 - tetrafluorocyclobutyl) -3,3,4,4-tetrafluorocyclobutene-1; and 1-(2,2,3,3-tetrafluorocyclobutyl)-propene-1, it is to be understood that my process is applicable broadly to any acyclic or alicyclic unsaturated fluorohydrocarbon, i. e. to any aliphatic (including cycloaliphatic) unsaturated fluorohydrocarbon which contains an unsaturated linkage between aliphatic, including cycloaliphatic, carbon atoms and in which each fluorine atom is attached to an aliphatic, including cycloaliphatic, carbon atom. Included among examples of said unsaturated fluorohydrocarbons, in addition to those disclosed above, are: tetrafluoroethylene; trifluoroethylene; 3-fluoropropene-1; 3-fluoro-2-methylpropene; 2,3-difluorononadiene-1,8; beta-fluorostyrene and the like.

As hereinbefore stated, the reaction mixture should be heated. Appreciable effects are had when the temperature employed is as low as about 20° C.; while temperatures ranging up to 200° C., or even higher in certain instances, may be employed. When nickel is employed as the catalyst, the reaction proceeds most smoothly at temperatures within the range of from 60° C. to 125° C. In general, a temperature within this range is preferred, although when the catalyst is a chromite of a metal which forms a hydrogenating oxide, optimum yields are had at temperatures above 150° C.

Pressures up to the practical limits of the equipment used may be employed. Generally, however, the process is operated at a pressure within the range of from 100 lbs./sq. in. to 3000 lbs./sq. in.; while maximum yields are obtained in the shortest time with the least difficulty when the pressure employed is within the range of from 1000 lbs./sq. in. to 2000 lbs./sq. in.

While this invention has been described with particular reference to the use of nickel catalysts, it is to be understood that any hydrogenation catalysts may be employed. By hydrogenation catalysts I refer to those substances, e. g., metals and metal oxides, which are capable under proper conditions of promoting the reaction of hydrogen with organic compounds. Included among examples of said hydrogenation catalysts are: chromites of metals which form hydrogenating oxides; ferrous metal catalysts prepared by the erosion of alloys; ferrous metal catalysts prepared by the reduction of salts of hydrogenating metals with sodium naphthalene in accordance with the process disclosed and claimed in U. S. Patent 2,177,412; and ferrous metal catalysts prepared by the reduction of metal oxides with hydrogen at 400–700° C. Specific hydrogenation metals which can be used in addition to nickel are cobalt, iron, platinum, palladium, ruthenium and their oxides and chromites.

Although in the examples the nickel catalyst is used in the pyrophoric state, it is sometime more practical to stabilize these pyrophoric metals by gradual exposure to an oxidizing atmosphere, maintaining the temperature of the catalyst mass below 50° C., until no further heat evolution is noted.

The proportion of catalyst employed may be varied over wide limits. Appreciable effects are obtained with an amount of catalyst as low as 5% or less (calculated on the basis of the weight of unsaturated fluorinated hydrocarbon being treated); and as much as 15% or even more by weight of said catalyst. Maximum yields with minimum catalyst cost are obtained when the amount of catalyst employed, calculated on the basis of the weight of unsaturated fluorinated hydrocarbon being treated, is within the range of from 8% to 12%. Obviously much more than 15% by weight of catalyst can be used but such practice is uneconomical.

It is to be understood, of course, that the reaction of the present invention must be carried out in the liquid phase. My process may be effected in the presence of inert solvents, or in the absence of such solvents. As examples of specific organic solvents which may be used may be mentioned the saturated lower aliphatic alcohols, such as methyl alcohol, ethyl alcohol, propyl alcohol, butyl alcohol and the like; ethers; and hydrocarbons. Any solvent can be used which is substantially inert to hydrogenation under the conditions employed and which is a liquid at the temperature and pressure used.

While this invention has been illustrated with particular reference to batch operations, it is to be understood that the process can be effected either as a continuous or as a semi-continuous operation, if desired.

By the process of this invention there may be obtained acyclic and alicyclic, i. e., aliphatic, including cycloaliphatic, saturated fluorohydrocarbons which, because of their chemical inertness are useful as diluents, solvents and reaction media.

As many apparently widely different embodiments of this invention may be obtained without departing from the spirit and scope thereof, it is to be understood that I do not limit myself to the specific embodiments thereof except as defined in the appended claims.

Having described the present invention, the following is claimed as new and useful.

1. The process for obtaining a short chain fluoroalkane which comprises heating an unsaturated acyclic fluorohydrocarbon containing from 2 to 9 carbon atoms with hydrogen in the liquid phase at a temperature within the range of from 60° C. to 125° C. under a pressure within the range of from 1000 lbs./sq. in. to 2000 lbs./sq. in. in the presence of a hydrogenation catalyst.

2. The process for obtaining tetrafluoroethane which comprises heating tetrafluoroethylene with hydrogen in the liquid phase at a temperature within the range of from 60° C. to 125° C. under a pressure within the range of from 1000 lbs./sq. in. to 2000 lbs./sq. in. in the presence of a nickel hydrogenation catalyst.

3. The process for obtaining 1-ethyl-2,2,3,3-tetrafluorocyclobutane which comprises heating 1-vinyl-2,2,3,3-tetrafluorocyclobutane with hydrogen in the liquid phase at a temperature within the range of from 60° C. to 125° C. under a pressure within the range of from 1000 lbs./sq. in. to 2000 lbs./sq. in. in the presence of a nickel hydrogenation catalyst.

4. A process which comprises reacting with hydrogen a member selected from the class consisting of fluoroalkenes and fluorinated cycloaliphatic hydrocarbons containing an ethylenic linkage, said reaction being conducted in the liquid phase, under superatmospheric pressure and in the presence of a hydrogenation catalyst.

5. The process of claim 4 wherein the temperature is maintained within the range of 20° C. to 200° C., and the pressure is maintained within the range of 100 pounds per square inch to 3,000 pounds per square inch.

6. A process which comprises reacting with hydrogen at a temperature within the range of 20° C. to 200° C., a fluorinated cycloaliphatic hydrocarbon containing an ethylenic linkage, said reaction being conducted in the liquid phase, at a pressure within the range of 100 pounds per square inch to 3,000 pounds per square inch, and in the presence of a hydrogenation catalyst.

7. A process which comprises reacting with hydrogen, at a temperature within the range of 20° to 200° C., a fluorinated hydrocarbon containing a polyfluorocyclobutyl group and an ethylenic unsaturation, said reaction being conducted in the liquid phase, at a pressure within the range of 100 pounds per square inch to 3,000 pounds per square inch, and in the presence of a hydrogenation catalyst.

8. The process of claim 7 wherein the polyfluorocyclobutyl group is a tetrafluorocyclobutyl group, the temperature is within the range of 60° C. to 125° C. and the pressure is within the range of 1,000 pounds per square inch to 2,000 pounds per square inch.

PAUL L. BARRICK.

REFERENCES CITED

The following references are of record in the file of this patent:

UNITED STATES PATENTS

| Number | Name | Date |
| --- | --- | --- |
| 2,118,662 | Baumann et al. | May 24, 1938 |

OTHER REFERENCES

Berkman et al.; "Catalysis," pages 815–822 (1940).